(12) United States Patent
Fujimoto et al.

(10) Patent No.: US 12,039,375 B2
(45) Date of Patent: Jul. 16, 2024

(54) RESOURCE MANAGEMENT DEVICE AND RESOURCE MANAGEMENT METHOD

(71) Applicant: Nippon Telegraph and Telephone Corporation, Tokyo (JP)

(72) Inventors: Kei Fujimoto, Musashino (JP); Kohei Matoba, Musashino (JP); Makoto Araoka, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 415 days.

(21) Appl. No.: 17/428,242

(22) PCT Filed: Feb. 4, 2020

(86) PCT No.: PCT/JP2020/004034
§ 371 (c)(1),
(2) Date: Aug. 3, 2021

(87) PCT Pub. No.: WO2020/166423
PCT Pub. Date: Aug. 20, 2020

(65) Prior Publication Data
US 2022/0138017 A1    May 5, 2022

(30) Foreign Application Priority Data
Feb. 15, 2019   (JP) .................................. 2019-025136

(51) Int. Cl.
*G06F 9/50* (2006.01)
*G06F 9/455* (2018.01)

(52) U.S. Cl.
CPC ........ *G06F 9/5077* (2013.01); *G06F 9/45558* (2013.01); *G06F 9/5027* (2013.01); *G06F 2009/4557* (2013.01)

(58) Field of Classification Search
None
See application file for complete search history.

(56) References Cited

U.S. PATENT DOCUMENTS 5,530,860 A * 6/1996 Matsuura .............. G06F 9/5038
718/105
2008/0028399 A1 * 1/2008 Gupta ................. G06F 9/45558
718/1

(Continued)

FOREIGN PATENT DOCUMENTS

CN   WO 2013078588 A1 * 6/2013   ........... G06F 9/5016
JP   H08249194         9/1996

(Continued)

*Primary Examiner* — Charles E Anya
(74) *Attorney, Agent, or Firm* — Fish & Richardson P.C.

(57) ABSTRACT

The processing performance of an entire system is enhanced by efficiently using CPU resources shared by a plurality of guests. A server 10 includes a host OS 104 and a plurality of guest OSs 110A and 110B running on a plurality of virtual machines 108A and 108B, respectively, which are virtually constructed on the host OS 104. The plurality of virtual machines 108A and 108B shares CPU resources implemented by hardware 102. A guest priority calculation unit 202 of a resource management device (resource management unit 20) calculates a processing priority of at least one of the guest OSs 110 based on at least one of a packet transfer rate from the host OS 104 to the guest OS 110 and an available capacity status of a kernel buffer of the host OS 104. A resource utilization control unit 204 controls allocation of a utilization time for CPU resources to be used by the plurality of guest OSs 110 based on the calculated processing priority.

7 Claims, 4 Drawing Sheets

(56) References Cited

U.S. PATENT DOCUMENTS

| | | | | |
|---|---|---|---|---|
| 2008/0163211 | A1* | 7/2008 | Mizuno | G06F 9/4881 |
| | | | | 718/1 |
| 2009/0113426 | A1* | 4/2009 | Mizuno | G06F 9/45533 |
| | | | | 718/1 |
| 2010/0169536 | A1* | 7/2010 | Shedel | G06F 9/45558 |
| | | | | 718/1 |
| 2010/0333100 | A1 | 12/2010 | Miyazaki et al. | |
| 2015/0052528 | A1* | 2/2015 | French | G06F 9/5033 |
| | | | | 718/1 |
| 2016/0077948 | A1* | 3/2016 | Goel | G06F 11/328 |
| | | | | 714/47.1 |
| 2016/0292000 | A1* | 10/2016 | Bernal | G06F 9/4856 |
| 2019/0138350 | A1* | 5/2019 | Kaneko | G06F 11/1482 |

FOREIGN PATENT DOCUMENTS

| | | | | |
|---|---|---|---|---|
| JP | H0946373 | | 2/1997 | |
| JP | 2000112858 | | 4/2000 | |
| JP | 2004021555 | | 1/2004 | |
| JP | 2012147206 | | 8/2012 | |
| JP | 2017041858 | | 2/2017 | |
| WO | WO 2009133669 | | 11/2009 | |
| WO | WO 2016006228 | | 1/2016 | |
| WO | WO 2016006228 | A1 * | 1/2016 | G06F 9/46 |

\* cited by examiner

RESOURCE MANAGEMENT DEVICE AND RESOURCE MANAGEMENT METHOD

CROSS-REFERENCE TO RELATED APPLICATIONS

This application is a National Stage application under 35 U.S.C. § 371 of International Application No. PCT/JP2020/004034, having an International Filing Date of Feb. 4, 2020, which claims priority to Japanese Application Serial No. 2019-025136, filed on Feb. 15, 2019. The disclosure of the prior application is considered part of the disclosure of this application, and is incorporated in its entirety into this application.

TECHNICAL FIELD

The present invention relates to a resource management device and a resource management method for a virtualization system.

BACKGROUND ART

A technique for enhancing the processing efficiency of a system by appropriately managing a resource utilization state in the system has heretofore been proposed.

For example, Patent Literature 1 to be described below discloses a technique for guaranteeing a band in a section between a host and a guest depending on the priority of packets so as to realize band guarantee under a virtualization environment.

Further, Patent Literature 2 to be described below discloses a technique for a dispatch from a task in a ready state so that CPU resources can also be allocated to tasks with a low priority when tasks with a high priority and tasks with a low priority are included in task scheduling for a real-time OS (Operating System).

Further, Patent Literature 3 to be described below discloses a technique for setting a priority for allocating processing tasks in task scheduling depending on the priority of packets and performing pre-emption of tasks depending on the priority.

CITATION LIST

Patent Literature

Patent Literature 1: Japanese Patent Laid-Open No. 2017-41858
Patent Literature 2: Japanese Patent Laid-Open No. 8-249194
Patent Literature 3: Japanese Patent Laid-Open No. 9-46373

SUMMARY OF THE INVENTION

Technical Problem

A technique is proposed in which a CPU time is allocated by switching time periods during which a plurality of guests (e.g., a first guest and a second guest) can use a CPU by a task scheduler, such as a CFS (Completely Fare Scheduler), so that a plurality of virtual machines shares CPU resources and runs under a server virtualization environment (e.g., a CFS is incorporated in Linux® kernel 2.6.23 and subsequent versions).

In such a configuration, during a time period when one of the guests uses the CPU, the other guest cannot perform processing using the CPU, which may lead to a network delay due to a wait for CPU time. For example, in a case where packets processed by the host are further processed by the first guest and the packets are transferred at a high transfer rate (e.g., 1 Gbps or more), the packets processed by the host cannot be processed within the CPU time allocated to the first guest and packets waiting to be processed are accumulated in a queue held by the first guest, which may lead to a large delay of about several hundreds of ms.

FIG. 4 is an explanatory diagram schematically illustrating a relationship between a CPU time and packet processing.

The left side of FIG. 4 schematically illustrates a packet processing status of the host and the right side of FIG. 4 schematically illustrates a packet processing status of the first guest when a longitudinal axis direction represents time and the first guest (Guest1) further processes packets processed by the host.

The host occupies the CPU and thus can continuously perform packet processing, while on the guest side, the CPU is shared by the first guest and the second guest (Guest2) and thus the packet processing is intermittently performed.

Accordingly, the first guest cannot complete the processing on packets reaching from the host within the CPU time, so that the packets are accumulated in a queue. As the processing advances, a plurality of CPU cycles need to be provided during a period from a time when a packet reaches the first guest from the host to a time when processing is executed, which cause a delay. For example, processing to be completed by the first guest at time T2 corresponds to the processing delivered by the host before time T1, and processing to be executed during a period from time T2 to time T1 is accumulated in the queue of the first guest. Further, when a number of packets corresponding to a maximum queue size of the first guest are accumulated, a packet loss occurs in subsequent processing.

To address such a problem, for example, it is possible to employ a method for reducing a network delay in packet processing by setting a high CPU usage priority for the first guest that executes packet processing and by increasing the CPU time to be allocated to the first guest. However, this method has a problem that the CPU time for the second guest steadily decreases, which leads to deterioration in CPU utilization efficiency. For example, when a nice value=−10 is set in a qemu-kvm process for the first guest, the CPU time for the second guest decreases, which makes it difficult to perform even SSH (Secure Shell) login to the second guest.

The present invention has been made in view of the above-described circumstances, and an object of the present invention is to enhance the processing performance of an entire system by efficiently using CPU resources shared by a plurality of guests.

Means for Solving the Problem

To achieve the above-described object, the invention according to claim 1 is a resource management device that manages resources for a virtualization system including a host OS running on hardware and a plurality of guest OSs running on a plurality of virtual machines, respectively, the plurality of virtual machines being virtually constructed on the host OS, the plurality of virtual machines sharing CPU resources implemented by the hardware, the resource management device including: a guest priority calculation unit that calculates a processing priority of at least one of the guest OSs based on at least one of a packet transfer rate from the host OS to the guest OS and an available capacity status of a kernel buffer of the host OS; and a resource utilization control unit that controls allocation of a utilization time for the CPU resources to be used by the plurality of guest OSs based on the processing priority calculated by the guest priority calculation unit.

Further, the invention according to claim 4 is a resource management method for a resource management device that manages resources for a virtualization system including a host OS running on hardware and a plurality of guest OSs running on a plurality of virtual machines, respectively, the plurality of virtual machines being virtually constructed on the host OS, the plurality of virtual machines sharing CPU resources implemented by the hardware, the resource management method including: a guest priority calculation step of calculating, by the resource management device, a processing priority of at least one of the guest OSs based on at least one of a packet transfer rate from the host OS to the guest OS and an available capacity status of a kernel buffer of the host OS; and a resource utilization control step of controlling, by the resource management device, allocation of a utilization time for the CPU resources to be used by the plurality of guest OSs based on the calculated processing priority.

With this configuration, the resource management device (resource management unit) can dynamically change the utilization time for the CPU resources to be used by the plurality of guest OSs, thereby enhancing the CPU utilization efficiency and reducing a network delay in the server due to a processing delay in each guest OS.

Further, the invention according to claim 2 is the resource management device according to claim 1, in which the guest priority calculation unit increases the processing priority of the guest OS as the packet transfer rate increases, or as the kernel buffer has a smaller available capacity.

Further, the invention according to claim 5 is the resource management method according to claim 4, in which in the guest priority calculation step, the processing priority of the guest OS is increased as the packet transfer rate increases, or as the kernel buffer has a smaller available capacity.

With this configuration, a packet processing load on each guest OS can be accurately reflected.

Further, the invention according to claim 3 is the resource management device according to claim 1 or 2, in which the guest priority calculation unit selects, as a calculation target for the processing priority, a guest OS that executes an application requiring network processing with a real-time performance from among the plurality of guest OSs.

Further, the invention according to claim 6 is the resource management method according to claim 4 or 5, in which in the guest priority calculation step, a guest OS that executes an application requiring network processing with a real-time performance is selected as a calculation target for the processing priority from among the plurality of guest OSs.

With this configuration, the CPU resources can be allocated depending on the state of each guest OS in which a processing load is likely to vary, and thus the CPU utilization efficiency can be enhanced.

Effects of the Invention

According to the present invention, the processing performance of an entire system can be enhanced by efficiently using CPU resources shared by a plurality of guests.

DESCRIPTION OF EMBODIMENTS

Preferred embodiments of a resource management device and a resource management method according to the present invention will be described in detail below with reference to the accompanying drawings. The present embodiment illustrates a case where the resource management device and the resource management method according to the present invention are applied to a server composed of a plurality of virtual machines (guests).

Figure 1:
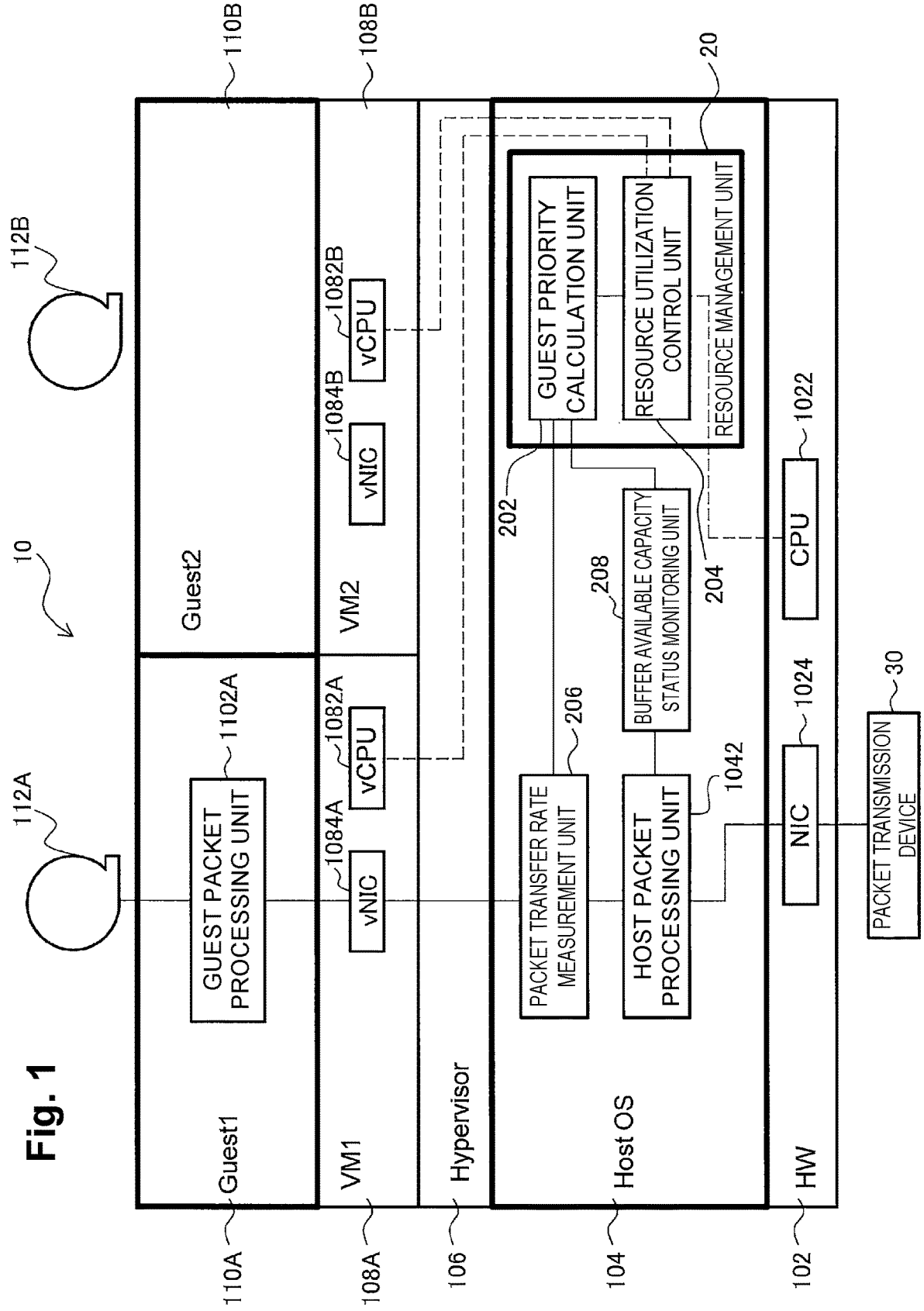
FIG. 1 is a diagram illustrating a configuration of a server according to an embodiment.

FIG. 1 is a diagram illustrating a configuration of a server 10 according to an embodiment.

The server 10 includes a piece of hardware (HW) 102, a host OS 104, a hypervisor 106, a first virtual machine (VM1) 108A, a first guest OS (Guest1) 110A, a second virtual machine (VM2) 108B, a second guest OS (Guest2) 110B, and applications 112A and 112B.

The hardware 102 is, for example, IA (Intel Architecture) server ("Intel" is a registered mark), and includes a CPU 1022 and a network interface card (NIC) 1024, which physically configure the server 10.

The host OS 104 provides functions of the hardware 102 to an upper layer.

The hypervisor 106 provides a virtualization environment on the host OS 104, and constructs, for example, the first virtual machine 108A and the second virtual machine 108B in the present embodiment.

The first virtual machine 108A and the second virtual machine 108B include virtual CPUs (vCPUs) 1082A and 1082B and virtual network interface cards (vNICs) 1084A and 1084B, respectively. However, in practice, the CPU 1022 and the network interface card 1024, which are included in the physical hardware 102, implement these functions.

The first guest OS 110A and the second guest OS 110B run on the first virtual machine 108A and the second virtual machine 108B, respectively. Hereinafter, the first guest OS 110A and the second guest OS 110B may be collectively referred to as the guest OS 110.

The applications 112A and 112B run on the first guest OS 110A and the second guest OS 110B, respectively.

That is, the server 10 is a virtualization system including the host OS 104 running on the hardware 102 and the plurality of guest OSs 110A and 110B running on the plurality of virtual machines 108A and 108B, respectively, which are virtually constructed on the host OS 104.

In the present embodiment, assume that the first guest OS 110A executes the application 112A that requires network processing with a high real-time performance (requires a real-time performance) and the second guest OS 110B executes the application 112B that performs non-real-time processing that requires CPU processing.

More specifically, in the first guest OS 110A, a guest packet processing unit 1102A processes packets transmitted from the packet transmission device 30 which is located outside the server 10. The packets transmitted from the packet transmission device 30 are first received by the network interface card 1024, and are then delivered to the guest packet processing unit 1102A through a host packet processing unit 1042 of the host OS 104.

The guest packet processing unit 1102A virtually performs packet processing using the virtual CPU 1082A, and substantively performs the processing using the CPU 1022. Similarly, as for the virtual CPU 1082B, the CPU 1022 substantively performs processing. In other words, the plurality of virtual machines 108A and 108B shares resources of the CPU 1022 implemented by the hardware 102.

For example, in a case where a time period during which the first guest OS 110A (virtual CPU 1082A) uses the CPU 1022 and a time period during which the second guest OS 110B (virtual CPU 1082B) uses the CPU 1022 are fixed, for example, when a processing load on one of the guest OSs 110 is increased (e.g., when the number of packets transmitted from the packet transmission device 30 is temporarily increased), a delay occurs in processing.

Accordingly, the host OS 104 is provided with a resource management unit 20 (resource management device) that manages the resources of the CPU 1022, thereby enhancing the utilization efficiency of the CPU 1022 and suppressing a processing delay in each guest OS 110.

The resource management unit 20 includes a guest priority calculation unit 202 and a resource utilization control unit 204.

The guest priority calculation unit 202 calculates a processing priority of at least one of the guest OSs 110 which are the plurality of guest OSs 110A and 110B (hereinafter referred to as a "monitoring target guest OS") based on at least one of a packet transfer rate from the host OS 104 to the guest OS 110 and an available capacity status of a kernel buffer of the host OS 104.

In the present embodiment, the resource management unit 20 includes a packet transfer rate measurement unit 206 and a buffer available capacity status monitoring unit 208, and measures the packet transfer rate and the available capacity status of the kernel buffer. Based on the measured values, the guest priority calculation unit 202 calculates a processing priority of a monitoring target guest OS. Note that the processing priority may be calculated using only one of the packet transfer rate and the available capacity status of the kernel buffer.

The packet transfer rate measurement unit 206 monitors the packet transfer rate for each of the guest OSs 110A and 110B, for example, when the packet transfer rate can be identified in each flow to each of the guest OSs 110A and 110B. For example, vhost-net, which is a virtual device, is generated for each virtual machine 108 (108A, 108B). Accordingly, if the packet transfer rate in this vhost-net is monitored, the packet transfer rate for each of the guest OSs 110A and 110B can be monitored.

On the other hand, the packet transfer rate for each of the guest OSs 110A and 110B cannot be obtained in some cases depending on the environment. In this case, for example, the packet transfer rate for a network device included in the host OS 104, such as /proc/net/dev, can be obtained. Note that if the number of packets to be transferred cannot be measured in each flow to each of the guest OSs 110A and 110B, the use of the two guest OSs 110A and 110B as the monitoring target guest OS as described below may be less effective.

As the buffer available capacity status monitoring unit 208, for example, a function for monitoring the available capacity status of the kernel buffer included in the kernel of the host OS 104 can be used. The use of this function makes it possible to detect the buffer available capacity status in real time and to take prompt measures, for example, when the available capacity of the buffer is about to used up.

When the buffer available capacity status monitoring unit 208 monitors, for example, the kernel buffer of the vhost-net described above as the monitoring target, the buffer available capacity status can be identified in each flow for each of the guest OSs 110A and 110B. On the other hand, in the case of monitoring a ring buffer managed by a network driver under control of the host OS 104, the buffer available capacity status in each flow for each of the guest OSs 110A and 110B cannot be measured.

The guest priority calculation unit 202 increases the processing priority of the monitoring target guest OS as the packet transfer rate for the guest OS 110 (especially, the monitoring target guest OS) increases, or as the kernel buffer has a smaller available capacity.

Specifically, when the packet transfer rate for the monitoring target guest OS is high, it is considered that the number of packets to be delivered from the host OS 104 to the monitoring target guest OS increases and a processing load on the monitoring target guest OS increases. Also, when the kernel buffer has a smaller available capacity, it is estimated that the number of packets to be delivered from the host OS 104 to the monitoring target guest OS increases and a processing load on the monitoring target guest OS increases.

Accordingly, the guest priority calculation unit 202 sets the processing priority of the monitoring target guest OS to a relatively high level when the packet transfer rate increases or when the available capacity of the kernel buffer decreases. On the contrary, the processing priority of the monitoring target guest OS is set to a relatively low level when the packet transfer rate decreases or when the available capacity of the kernel buffer increases.

Note that the relationship between the packet transfer rate or the available capacity value of the kernel buffer and the processing priority may be dynamically calculated by machine learning.

The resource utilization control unit 204 controls allocation of a utilization time for CPU resources to be used by the plurality of guest OSs 110A and 110B based on the processing priority calculated by the guest priority calculation unit 202.

Figure 2:
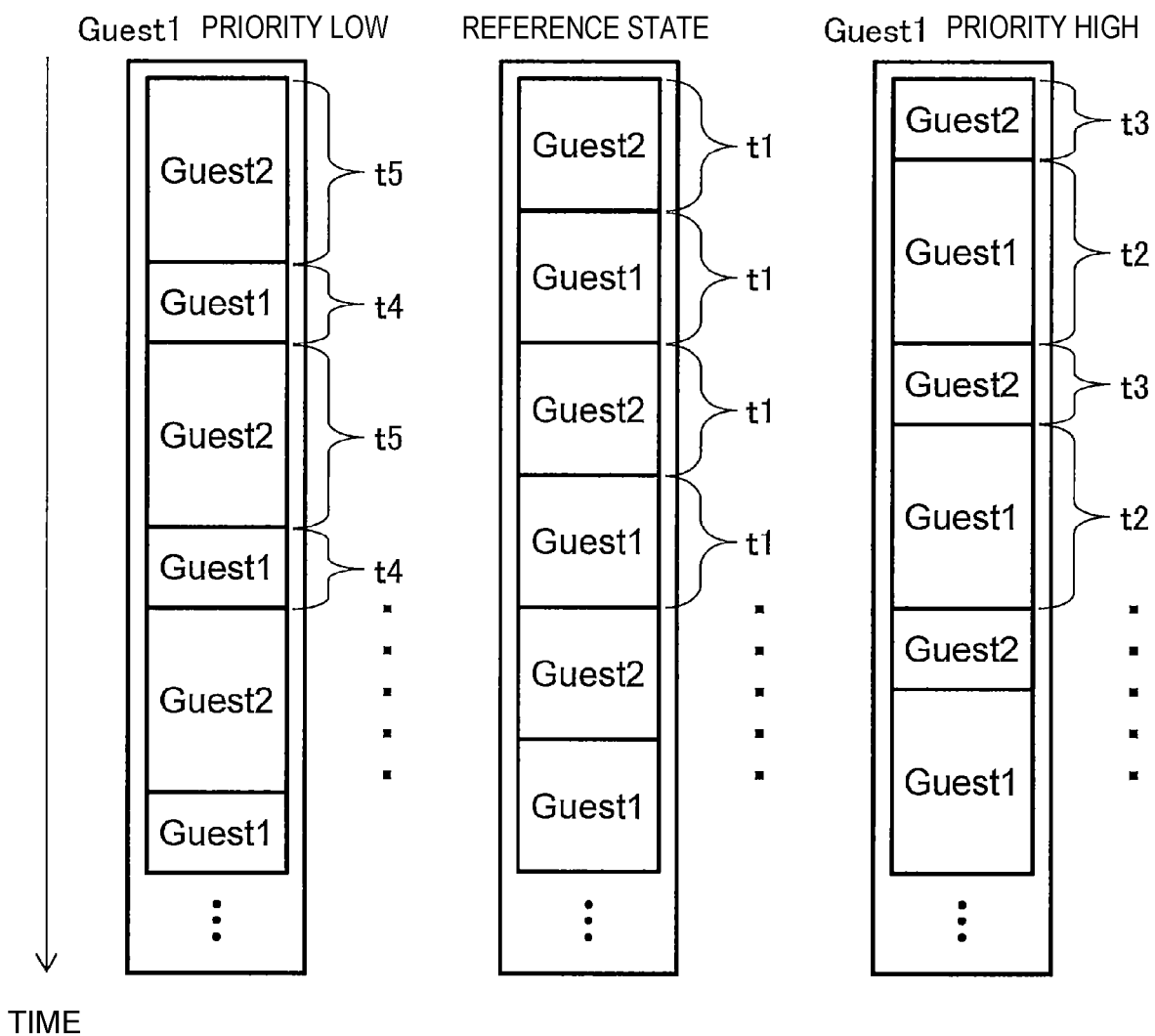
FIG. 2 is an explanatory diagram schematically illustrating allocation of a utilization time for CPU resources by a resource utilization control unit.

FIG. 2 is an explanatory diagram schematically illustrating allocation of a utilization for CPU resources by the resource utilization control unit 204.

The central portion of FIG. 2 illustrates the allocation of the utilization time in a predetermined reference state (e.g., the processing priority of the first guest OS 110A exceeds a predetermined threshold 1 and less than a predetermined threshold 2 (>threshold 1)). In the reference state, for example, the first guest OS 110A (Guest1) and the second guest OS 110B (Guest2) alternately use the CPU 1022 every predetermined period (t1).

The right side of FIG. 2 illustrates the allocation of the utilization time when the processing priority of the first guest OS 110A is high (e.g., more than or equal to the above-described threshold 2). In this case, the utilization time for the CPU 1022 of the first guest OS 110A is set to be longer than that of the second guest OS 110B. Specifically, for example, the utilization time for the CPU 1022 to be used by the first guest OS 110A is set to be longer than that in the reference state (t2 (>t1) in the illustrated example), and the utilization time for the CPU 1022 to be used by the second guest OS 110B is set to be shorter than that in the reference state (t3 (<t1) in the illustrated example). Time t2 may be set to be longer (time t3 may be set to be shorter) in proportion to the level of the processing priority of the first guest OS 110A.

The left side of FIG. 2 illustrates the allocation of the utilization time when the processing priority of the first guest OS 110A is low (e.g., less than or equal to the above-described threshold 1). In this case, the utilization time for the CPU 1022 to be used by the first guest OS 110A is set to be shorter than that by the second guest OS 110B. Specifically, for example, the utilization time for the CPU 1022 to be used by the first guest OS 110A is shorter than that in the reference state (t4 (<t1) in the illustrated example), and the utilization time for the CPU 1022 by the second guest OS 110B is set to be longer than that in the reference state (t5 (>t1) in the illustrated example). Time t4 may be set to be shorter (or time t5 may be set to be longer) in proportion to the level of the processing priority of the first guest OS 110A.

In this manner, the utilization time for the CPU 1022 to be used by each guest OS 110 is dynamically set based on the processing priority of the first guest OS 110A, or the speed of packets, thereby making it possible to enhance the utilization efficiency of the CPU 1022 as compared with a case where the priority of one of the guest OSs 110 is fixed.

Note that in the present embodiment, the guest priority calculation unit 202 selects, from among the plurality of guest OSs 110, a guest OS that executes an application requiring network processing with a high real-time performance, i.e., the first guest OS 110A, as a processing priority calculation target (monitoring target guest OS), and the resource utilization control unit 204 controls allocation of the utilization time for CPU resources based on the processing priority of the first guest OS 110A.

Thus, the utilization time for the CPU 1022 can be allocated in an optimum form for performing processing with a high real-time performance on which a processing delay has a great effect.

Note that both the first guest OS 110A and the second guest OS 110B can be set as the monitoring target guest OS. However, as described above, if it is difficult to measure the packet transfer rate or the available capacity status of the kernel buffer for each of the guest OSs 110A and 110B, unlike in the case illustrated in the present embodiment, for example, when the first guest OS 110A and the second guest OS 110B execute the applications 112A and 112B that require network processing with a high real-time performance, respectively, it is considered that the effect of enhancing the utilization efficiency of CPU resources is deteriorated.

Alternatively, only the second guest OS 110B may be set as the monitoring target guest OS.

Figure 3:
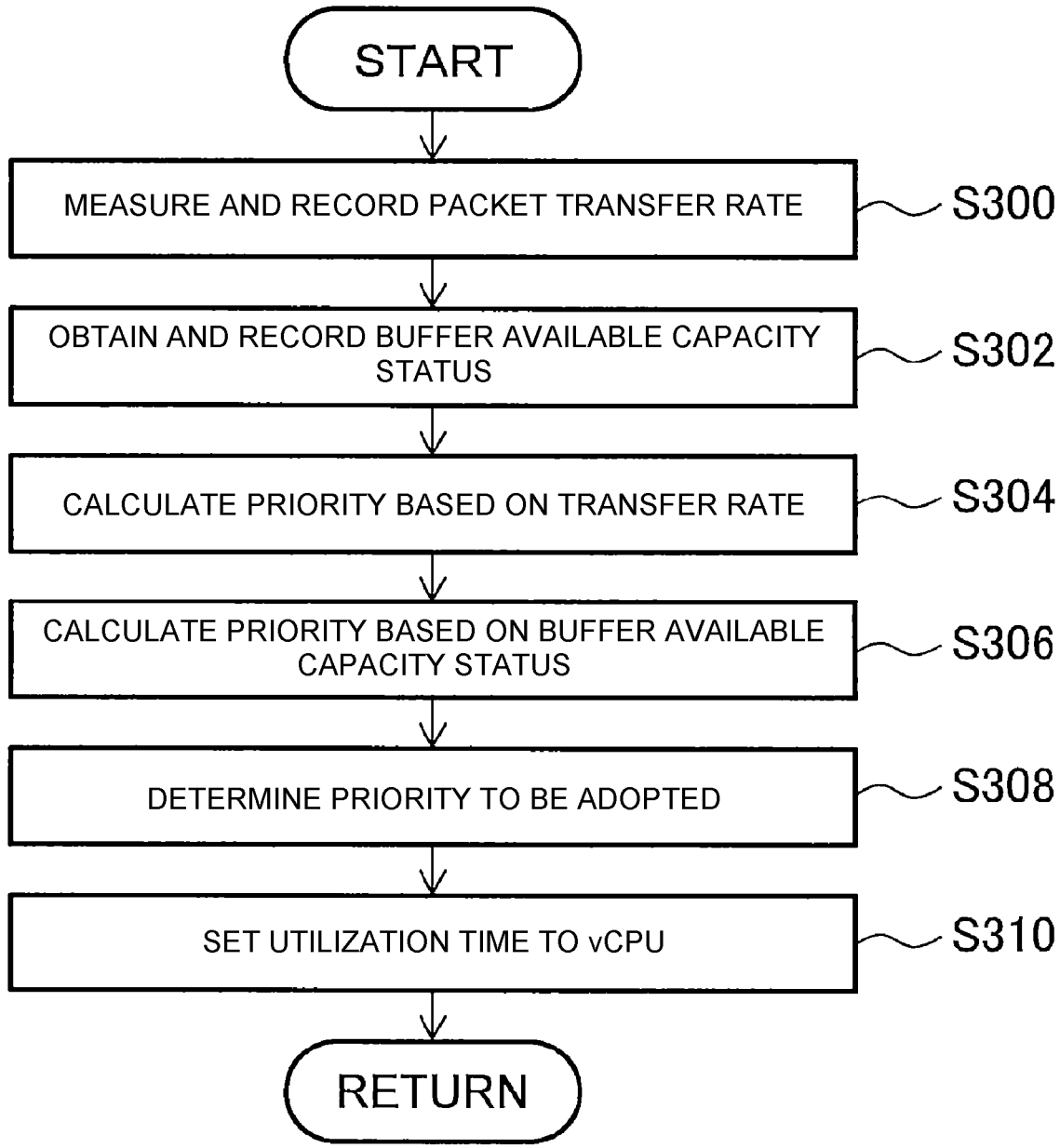
FIG. 3 is a flowchart illustrating a procedure for processing to be performed by a resource management unit.
Figure 4:
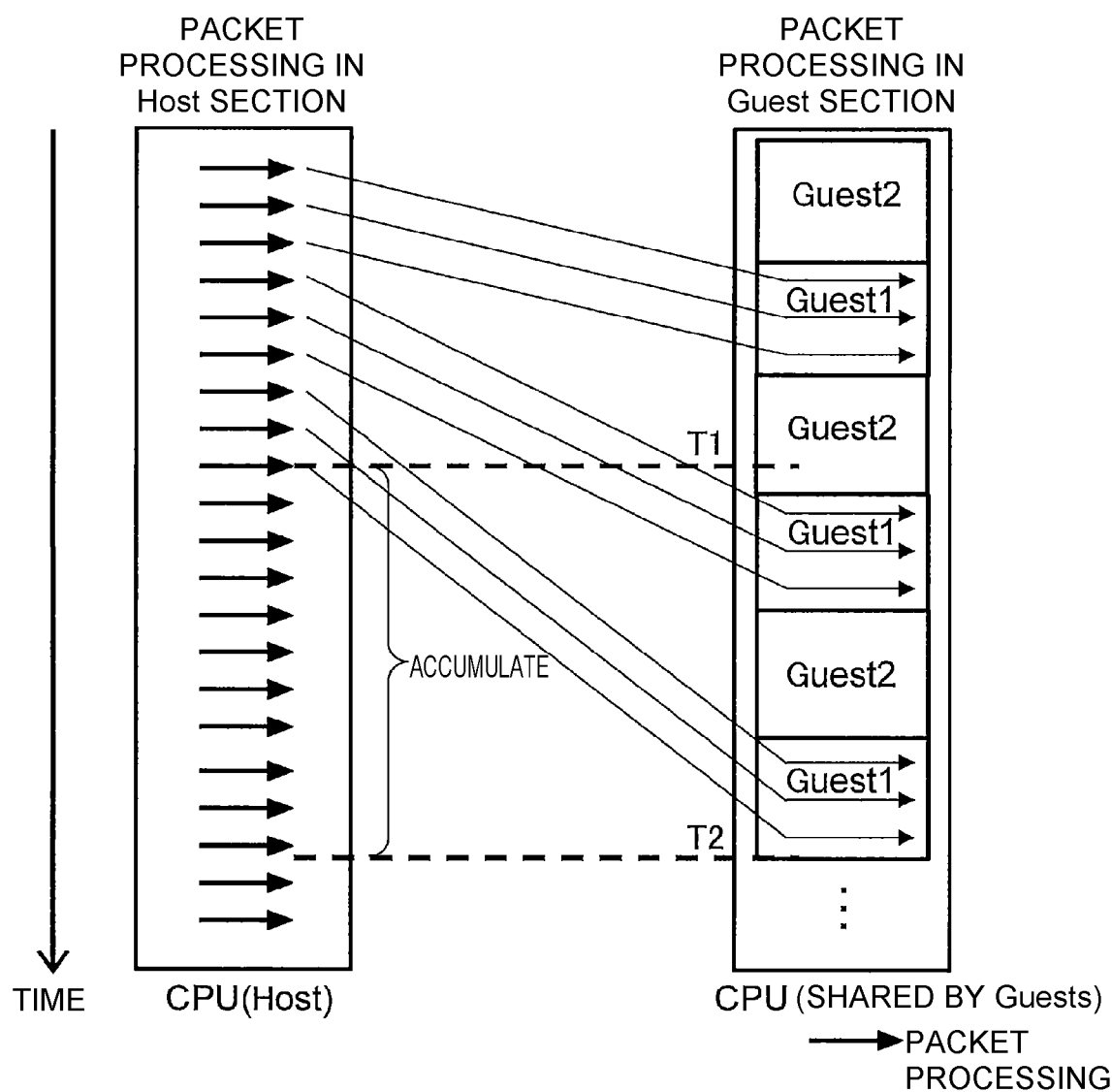
FIG. 4 is an explanatory diagram schematically illustrating a relationship between a CPU time and packet processing.

FIG. 3 is a flowchart illustrating a procedure for processing to be performed by the resource management unit 20.

The packet transfer rate measurement unit 206 measures the transfer rate (e.g., xxMbps) of packets from the host OS 104 to the guest OS 110, and temporarily records the measured value on a memory or the like (step S300).

The buffer available capacity status monitoring unit 208 obtains the available capacity status of the kernel buffer of the host OS 104, and temporarily records the obtained value in a memory or the like (step S302).

The guest priority calculation unit 202 calculates the processing priority of the first guest OS 110A based on the packet transfer rate measured in step S300 (step S304), and calculates the processing priority of the first guest OS 110A based on the available capacity status of the kernel buffer obtained in step S302 (step S306).

The guest priority calculation unit 202 determines the processing priority to be adopted based on the processing priorities calculated in step S304 and step S306 (step S308). Specifically, for example, a higher one of two processing priorities is adopted.

Then, the resource utilization control unit 204 sets the utilization time for the CPU 1022 to the virtual CPUs (vCPUs) 1082A and 1082B of the respective virtual machines 108A and 108B based on the adopted processing priority (step S310).

The resource management unit 20 repeats the procedure for the processing described above at predetermined time intervals, thereby making it possible to dynamically change the utilization time for CPU resources to be used by the plurality of guest OSs 110.

As described above, the server 10 according to the embodiment can dynamically change the utilization time for CPU resources to be used by a plurality of guest OS, thereby enhancing the CPU utilization efficiency and reducing a network delay in a server due to a processing delay in each guest OS.

REFERENCE SIGNS LIST

10 Server
102 Hardware
1022 CPU
104 Host OS
1042 Host packet processing unit
106 Hypervisor
108 (108A, 108B) Virtual machine
1082 (1082A, 1082B) Virtual CPU
110 (110A, 110B) Guest OS
1102A Guest packet processing unit
112 (112A, 112B) Application
20 Resource management unit (resource management device)
202 Guest priority calculation unit
204 Resource utilization control unit
206 Packet transfer rate measurement unit
208 Buffer available capacity status monitoring unit
30 Packet transmission device

The invention claimed is:

1. A virtualization system implementing a host OS running on hardware and a plurality of guest OSs running on a plurality of virtual machines, respectively, the plurality of virtual machines being virtually constructed on the host OS, the plurality of virtual machines sharing CPU resources implemented by the hardware, the virtualization system comprising one or more processors configured to perform:
   calculating a first processing priority of at least one of the guest OSs based on a packet transfer rate from the host OS to the guest OS, calculating a second processing priority of the guest OSs based on an available capacity status of a kernel buffer of the host OS, and determining a selected processing priority of the guest OS by selecting a higher one of the first processing priority and the second processing priority; and
   controlling allocation of a utilization time for the CPU resources to be used by the plurality of guest OSs based on the selected processing priority.

2. The virtualization system according to claim 1, wherein the first processing priority of the guest OS is calculated such that the first processing priority increases as the packet transfer rate increases.

3. The virtualization system according to claim 1, wherein the one or more processors are further configured to perform: selecting, as a calculation target for the first processing priority, a guest OS that executes an application requiring network processing with a real-time performance from among the plurality of guest OSs.

4. A resource management method for a resource management device configured to manage resources for a virtualization system implementing a host Operating System (OS) running on hardware and a plurality of guest OSs running on a plurality of virtual machines, respectively, the plurality of virtual machines being virtually constructed on the host OS, the plurality of virtual machines sharing CPU resources implemented by the hardware, the resource management method comprising:
  calculating a first processing priority of at least one of the guest OSs based on a packet transfer rate from the host OS to the guest OS, calculating a second processing priority of the guest OSs based an available capacity status of a kernel buffer of the host OS, and determining a selected processing priority of the guest OS by selecting a higher one of the first processing priority and the second processing priority; and
  controlling allocation of a utilization time for the CPU resources to be used by the plurality of guest OSs based on the selected processing priority.

5. The resource management method according to claim 4, wherein the first processing priority of the guest OS is calculated such that the first processing priority increases as the packet transfer rate increases.

6. The resource management method according to claim 4, further comprising:
  selecting, as a calculation target for the processing priority, a guest OS that executes an application requiring network processing with a real-time performance from among the plurality of guest OSs.

7. The virtualization system according to claim 1, wherein the second processing priority of the guest OS is calculated such that the second processing priority increases as the available capacity of the kernel buffer of the host OS decreases.

* * * * *